US007214948B2

(12) United States Patent
Mezei et al.

(10) Patent No.: US 7,214,948 B2

(45) Date of Patent: May 8, 2007

(54) NEUTRON OPTICAL COMPONENT FOR THE SMALL ANGLE NEUTRON SCATTERING MEASURING TECHNIQUE

(75) Inventors: Ferenc Mezei, Berlin (DE); Daniel Clemens, Berlin (DE); Lounis Mokrani, Berlin (DE)

(73) Assignee: Hahn-Meitner-Institut Berlin GmbH., Berlin (DE)

( * ) Notice: Subject to any disclaimer, the term of this patent is extended or adjusted under 35 U.S.C. 154(b) by 179 days.

(21) Appl. No.: 10/502,843

(22) PCT Filed: Aug. 25, 2003

(86) PCT No.: PCT/DE03/02869

§ 371 (c)(1), (2), (4) Date: Apr. 4, 2005

(87) PCT Pub. No.: WO2004/021365

PCT Pub. Date: Mar. 11, 2004

(65) Prior Publication Data

US 2005/0178972 A1 Aug. 18, 2005

(30) Foreign Application Priority Data

Aug. 25, 2002 (DE) ................................ 102 39 691

(51) Int. Cl.
*G01T 3/00* (2006.01)

(52) U.S. Cl. .............. 250/390.1; 250/251; 250/390.04; 250/390.05

(58) Field of Classification Search ..................... None
See application file for complete search history.

(56) References Cited

U.S. PATENT DOCUMENTS 5,606,167 A * 2/1997 Miller ................... 250/390.04

FOREIGN PATENT DOCUMENTS

EP 0349761 1/1990

OTHER PUBLICATIONS

Seeger et al.: The Low-Q Diffractometer at the Los Alamos Neutron Scattering Center; Mol. Cryst. Liq. Cryst., 1990, vol. 180A, pp. 101-117.

(Continued)

*Primary Examiner*—Nikita Wells
*Assistant Examiner*—Zia R. Hashmi
(74) *Attorney, Agent, or Firm*—Karl Hormann

(57) ABSTRACT

A high measuring resolution along with a large irradiation surface and a high beam intensity are required for structural analysis of material according to the small angle neutron scattering measuring technique. However, with known diaphragm collimators, the necessary beam divergence cannot be reached without an unacceptable loss of intensity. The inventive neutron optical component (1) comprises a plurality of successively arranged pinhole diaphragms embodied as grating diaphragms (7), each grating diaphragm (7) comprising a plurality of diaphragm apertures (14). In this way, the neutron beam is divided into individual beams which are each improved in terms of the convergence thereof. Furthermore, the channels defined by the course of the grating diaphragms (7) by means of respectively identically positioned diaphragm apertures (14) are narrowed according to the convergence cone provided by the structure of the measuring instrument. Simultaneously, all of the partial beams can be focused onto the detection spot. In order to select monochrome neutrons, the grating diaphragms (7) are positioned on the speed-dependent parabolic paths. In this way, the claimed, neutron optical element does not only function as a high-resolution, focusing collimator, but also as a speed selector. The continuous and cyclic displacement of the grating diaphragms (7) over all of the parabolic paths enables the entire neutron beam to be used. In this way, the inventive neutron optical element can be especially used for pulsed neutron beams.

15 Claims, 4 Drawing Sheets

OTHER PUBLICATIONS

Print-out of http://www.isis.rl.ac.uk/instruments/instruments.html.

S. Borbely: The Small-Angle Neutron Scattering Spectrometer "Yellow Submarine"; Printout of http://www.iki.kfki.hu/nuclear/bnc/instruments/instr__sans.html.

Alefeld et al.: Hochaufloesendes Reflektometer und Kleinwinkelstreuanlage mit fokussierendem Spiegel (KWS 3); print-out od http://www.fz-juelich.de/iff/Institute/ism/pictures/poster.jpg.

Keiderling et al.: "New SANS instrument at the BER II reactor in Berlin, Germany"; Physica B 213&214 (1995) 895-897.

Seeger: "Comparison of Collimation Systems for Small-Angle Neutron Scattering"; Physica 136B (1986), 106-109, North Holland, Amsterdam.

* cited by examiner

| i | pos | div | open | redf |
|---|---|---|---|---|
| 0.00000 | 0.00000 | 0.01500 | 2.00000 | 1.00000 |
| 1.00000 | 31.07903 | 0.01500 | 1.98446 | 0.99223 |
| 2.00000 | 61.91659 | 0.01500 | 1.96904 | 0.98452 |
| 3.00000 | 92.51455 | 0.01500 | 1.95374 | 0.97687 |
| 4.00000 | 122.87477 | 0.01500 | 1.93856 | 0.96928 |
| 5.00000 | 152.99910 | 0.01282 | 1.92350 | 0.96175 |
| 6.00000 | 187.92064 | 0.01039 | 1.90604 | 0.95302 |
| 7.00000 | 230.52315 | 0.00843 | 1.88474 | 0.94237 |
| 8.00000 | 282.34796 | 0.00683 | 1.85883 | 0.92941 |
| 9.00000 | 345.17014 | 0.00554 | 1.82741 | 0.91371 |
| 10.00000 | 420.99408 | 0.00450 | 1.78950 | 0.89475 |
| 11.00000 | 512.02386 | 0.00366 | 1.74399 | 0.87199 |
| 12.00000 | 620.59448 | 0.00297 | 1.68970 | 0.84485 |
| 13.00000 | 749.04724 | 0.00242 | 1.62548 | 0.81274 |
| 14.00000 | 899.53040 | 0.00197 | 1.55023 | 0.77512 |
| 15.00000 | 1073.70813 | 0.00161 | 1.46315 | 0.73157 |
| 16.00000 | 1272.37109 | 0.00132 | 1.36381 | 0.68191 |
| 17.00000 | 1494.96436 | 0.00109 | 1.25252 | 0.62626 |
| 18.00000 | 1739.08862 | 0.00090 | 1.13046 | 0.56523 |
| 19.00000 | 2000.08899 | 0.00075 | 1.99996 | 0.49998 |

NEUTRON OPTICAL COMPONENT FOR THE SMALL ANGLE NEUTRON SCATTERING MEASURING TECHNIQUE

The invention relates to a neutron optical structural element for the technique of measuring small angle neutron scattering, with a plurality of pinhole diaphragms of a neutron absorbing material held in support elements in the direction of the neutron beam from the neutron source to the measuring sample the small-angle beam scattering of which is to be measured, each pinhole diaphragm been provided with at least one active diaphragm opening for reducing the beam divergence.

Neutron optical structural elements are components for conducting, for deflecting and for deliberately affecting a neutron beam and a cold neutron beam, in particular. They are being used in measuring structures for the technique of measuring neutron small-angle scattering. In order to be able to execute specific measurements, the neutrons must have specific properties induced by the neutron optical components, such as, a predetermined energy (equivalent with velocity), divergence or focusing on the measuring site. The small angle neutron scattering (SANS) in which the neutron radiation scattered by the measuring sample as result of physical or chemical inhomogeneities is detected by a suitable measuring instrument in a relatively small forward-directed angular range as seen from the sample, represents a key technology for examining structures in the range of nanometers (1 nm to 100 nm) or higher (ultra small angle neutron scattering=USANS). Possible applications for SANS are, for instance, in biology and medicine, the chemistry of polymers, material sciences, physics, geology of metallurgy.

For reducing the divergence of a neutron beam, a so-called collimator is used as the neutron optical component in a measuring instruments. In this respect, a basic distinction is made between a "layered collimator" structured of alternating neutron-reflecting and neutron-absorbing foils, and an "diaphragm collimator", representing a diaphragm system of slotted or orifice diaphragm openings comparable to optics. The diaphragm collimators normally used in SANS are simple pinhole diaphragms provided with a central and several diaphragm openings of 1 to 2 cm diameter circularly arranged in a disc of neutron-absorbing material. The pinhole diaphragms are mounted in a support element and are arranged in the beam path of the neutron beam. In general, they are spaced between 2 m and 16 m from each other. In current technology, such pinhole diaphragms are being used in the "LOQ diffractomter" of the English ISIS system (see http://www.isis.rl.uk/largescale/LOQ/images/Log.gif state 21 Aug. 2002) or in the SANS spectrometer "Yellow Submarine" (see http://www.iki.kfki.hu/nuclear/bnc/instruments/instr_sans.html state 19 Aug. 2002. From the paper "New SANS Instrument at the BER II Reactor in Berlin, Germany by U. Keiderling and A. Wiedenmann (Physica B 213 & 214 (1995) pp. 895–897), a multi-functional collimator system is known which consists of four rotatable drum sections, which in the manner of a revolver are provided with different neutron optical components. One of them being a pinhole diaphragm, it is possible with this known collimator to rotate at most four pinhole diaphragms into the neutron beam; but only the pinhole diaphragms at the beginning and at the end of the measuring instrument are effective. In the "Yellow Submarine" SANS spectrometer three spaced pinhole diaphragms are used all of which are effective.

The LOQ diffractometer, being the closed prior art upon which the instant invention is based, utilizes two pinhole diaphragms. On both pinhole diaphragms several diaphragm orifices of different diameters are circularly arranged and may, if required, be rotated into the neutron beam, so that only one diaphragm orifice is active at any given time. One of the pinhole diaphragms is arranged in the forward section of the extent of the neutron beam between the neutron source and the sample, and the other one is arranged in the rear or terminal section. The divergence of the neutron beam is reduced by neutron beams being passed only through the pinhole diaphragms. Beyond the pinhole diaphragms the neutron-absorbing material, of which the pinhole diaphragms are made, destroys those neutrons the trajectories of which do not extend within the desired cone of divergence. A reduction in the size of the pinhole diaphragm and/or an enlargement of the space between the active pinhole diaphragms reduces the cone of divergence and thus improves the instrumental resolution of the measuring instrument. A reduction of the beam angle of the cone of divergence and a reduction of the size of the size of the pinhole diaphragm doe, however, entail a significant reduction of the beam intensity which can be measured behind the diaphragm system. Therefore, with the transmission of the measuring sample it is not possible simultaneously to achieve a sufficient neutron intensity and a high measuring resolution.

The combination reflectometry and small-angle scattering system KWS3 with a focusing mirror (see: http://www.fz-juelich.de/iff/lnstitute/ism/pictures/poster.jpq, state 21 Aug. 2002 is known for improving the measuring resolution. As its focusing neutron optical component, it uses a toroidal mirror with a plurality of curved reflective layers which focuses the electron beam in several planes through the sample to a point in the plane of the detector. However, the manufacture such a mirror is very complex. To reduce the beam divergence, a pinhole diaphragm the orifice of which can be changed between 1 $mm^2$ and 100 $mm^2$ is positioned in front of the toroidal mirror. While it is possible to reduce the beam divergence with this much smaller orifice, by comparison with other known pinhole diaphragms with orifices in the $cm^2$ range, it also significantly reduced the beam intensity. Other focusing neutron optical components are provided with refractive lenses, magnetic lenses or curved crystals. In these neutron optical components, the resultant focus is a function of the neutron velocity which adversely affects their use in measuring instruments of the kind which relying upon a broad velocity distribution. These are, for example, neutron instruments operating on the time-of-flight principle as primarily used at modern neutron sources, i.e. spallation neutron sources. In these devices it is important completely to utilize every pulse. Refractive lenses extend over many centimeters along the neutron beam. In connection with the applicable materials, this leads to intensity losses. Reflective or refractive neutron optical components, because of their inherent scattering characteristics resulting from the fact that they cannot be fabricated ideally, adversely affect the scattered image.

In continuous or pulsed neutron beams there are neutrons of different velocities. Because of the equivalence of the neutron wavelength velocity, neutrons of the same velocity may thus be called "monochromatic neutrons". In order to make available only neutrons of one wavelength band it is necessary to select one velocity. This is accomplished by a velocity selector of the kind known from KWS3. It is a neutron optical component with a rotating drum along which there are arranged absorbing pockets of helical configuration. The stationary drum is impervious to neutrons since there is no free connection through the empty channels between the helical pockets. However, during rotation neutrons of suitable velocity pass through these channels. The manufacture of this velocity selector is relatively complex.

Since because of their mass neutrons are subject to gravity their trajectory is parabolic. Its curvature is dependent upon the velocity of the neutrons. Hence, the parabolic path is a wavelength selective screening measure for monochromatic neutrons. The trajectory of fast neutrons is flat, whereas the trajectory of slow neutrons is strongly curved.

The above discussion of the prior art being the background, it is an object of the present invention to improve a neutron optical component with pinhole diaphragm so that when functioning as a diaphragm collimator it attains a high measuring resolution. Depending upon the beam divergence on as large a transmission surface of the measuring sample as possible, this requires a sufficiently high radiation intensity. Furthermore, the neutron optical component in accordance with the invention is to be able to perform other functions affecting the beam, such as, in particular, beam focusing and velocity selection. Its use in connection with pulsed neutron beams is to be possible. Its multi-functionality notwithstanding, the neutron optical component in accordance with the invention is to be relatively simple in terms of its construction and technical execution. Moreover, it is not adversely to affect to scattered images.

In a neutron optical component for the measuring technique of small-angle neutron scattering of the kind referred to above, the object is accomplished by number n of pinhole diaphragms of variable spacing from each other and structured as lattice diaphragms being provided as a function of the required measuring resolution and the longitudinal dimension of the neutron beam, and by each lattice diaphragm being provided with a constant number m of closely adjacent diaphragm openings which divide the penetrating neutron beam into a number m of partial beams and the size of which is reduced in the direction of the measuring sample to reduce the divergence of the partial beams, with each of the diaphragm openings of all of the n lattice diaphragms defining a partial beam being arranged, during a time interval defined by the time of flight of monochromatic neutrons, on the parabolic trajectory path thereof and all partial beams being focused on the detector.

The neutron optical component in accordance with the invention is provided with pinhole diaphragms structured as lattice diaphragms. The significantly smaller diaphragm openings, compared to known diaphragm openings, with its resultant significantly reduced beam divergence leads to a particularly high resolution during transmission fo the measuring sample. The significant intensity loss resulting from a simple reduction of a diaphragm opening is, however, avoided by the neutron beam provided by the neutron source being divided into a number of partial beams by the sieve-like formation of the pinhole diaphragms structured as lattice diaphragms with a large number of small diaphragm openings. Each partial beam representing its own channel is continuously conducted through all diaphragm openings associated with each other on all the lattice diaphragms and is thus continuously improved in its divergence. As a result of the sum of all individually improved partial beams a large single beam surface on the measuring sample is penetrated at high intensity. Compared to a conventional single-channel system, the irradiated measuring sample surface can be enlarged by a factor of 10 to 100. In this connection, the intensity of the neutron beam is hardly diminished, the available neutrons are optimally utilized which is of particular advantage in the case of a pulsed neutron beam. Because of the many small diaphragm openings, advantageously dimensioned at 1 to 2 mm which can be cut at high fabrication tolerances of from 01 to 0.02 mm by highly precise computer assisted fabrication techniques, the intensity losses resulting from neutron absorption in the webs between the diaphragm openings are kept at very low levels. By dimensioning the width of the webs, migration of neutrons between individual channels is nevertheless prevented.

Furthermore, since the individual partial beams are focused on the detector site, a focusing collimator is realized by the invention. Focusing is accomplished by a suitable guidance of the beam of all the individual ray channels directed to the focus. The measure of the reduction is dependent upon the cone of convergence formed by the entire measuring instrument. The cone determines the entire structure of the collimator in accordance with the invention as regards number and space between individual lattice diaphragms as well as number, spacing and size of the diaphragm openings. A change of the cone of divergence thus entails a change of the collimator structure. The cone of divergence commences at the beam cross section of the neutron beam provided by the neutron source and terminates at the, ideally, point-shaped detector site. The length of the cone of divergence is defined by the longitudinal dimension between the beginning of the neutron beam and the detector site in the measuring instrument. The measuring sample is positioned in the cone of convergence according to the desired transmission surface. The required reduction of the individual diaphragm openings as a function of the position of any given pinhole opening in the cone of convergence may thus be calculated by the law governing beams. A computer-assisted calculation for determining the parameters is useful.

The number of lattice diaphragms used depends upon the path length of the neutron beam in the measuring instrument. For instance, twenty lattice diaphragms may be arranged within a compacted structure (e.g. 2 m). In selecting the number it is important to ensure proper conductance of individual partial beams which is provided by the space between the diaphragm openings in the individual lattice diaphragms and by the absorption in the surrounding webs. Since at the initial section of the neutron beam the divergence of the partial beams is still relatively large, sufficient beam conductance may advantageously achieved by a dense arrangement of lattice diaphragms. At an increasing reduction of the divergence the spacing between the individual lattice diaphragms may be enlarged in the direction of the measuring sample. For that reason, increasing the spacing between the lattice diaphragms in the direction of the measuring sample is advantageous in the execution of the invention. Furthermore, th lattice diaphragms may be structured as lattice frames with square diaphragm openings. Lattice frames of this kind, which may be made of cadmium because of its excellent neutron absorbing properties, are simple structural elements the square diaphragm openings of which in a linear or columnar array may be fabricated much more easily than round diaphragm openings. The dimensions of the requisite absorbing webs and the reduction of the individual diaphragm openings in the course of the cone of divergence may be numerically calculated and executed without any problems. With the neutron optical component in accordance with the invention the measuring resolution of the measuring instrument may be freely adjusted in wide ranges by a suitable number N of lattice diaphragms and number m of diaphragm openings for the channel formation.

In its function as a focusing collimator the neutron optical component in accordance with the invention consists of an arrangement of several lattice diaphragms which admit only courses of rays extending to the same site in the detector plane. A predetermined diaphragm opening in each lattice opening is associated with each channel. The consecutive array of lattice diaphragms thus defines the individual channel or converging course of the individual partial beams to the focus in the detector plane. For generating the individual channels, the diaphragm openings of the lattice diaphragms must be precisely positioned in the ray path of the of the neutron beam. The exact alignment of the lattice diaphragms along or for defining the ray path is accomplished by the support elements in which the lattice diaphragms are mounted. An alignment of 0.01 mm or better can be achieved by vertical translation devices of high adjustment precision, such as, for instance micrometer calibration screws or piezo actuators. The alignment of the lattice diaphragms or of the individual diaphragm openings is carried out in the parabolic trajectories of the monochromatic neutrons which are characterized by their flight velocity since they are subject to gravity. Any permitted parabolic path is flown through only by neutrons of substantially the same velocity and, hence, wavelength. A narrow wavelength band around an ideal wavelength which in turn results from the neutron velocity is permitted to path the collimator system as a result of the precise alignment of all diaphragm openings defining a channel or partial beam over all of the lattice diaphragms. Accordingly, the neutron optical component in accordance with the invention provides for velocity selection. Hence, it does not only function as a focusing collimator, but also as a velocity selector. Therefore, the neutron optical component in accordance with the invention satisfies two essential SANS measuring technique functions and is constituted as a multi-functional highly compact component which is simple to manufacture. Complex rotating velocity selectors of the kind known in the prior art are not required.

In a vertical alignment of the lattice diaphragms a distinction must be made between the static and the dynamic case. In the static case of a continuous neutron beam velocity selection is required. In that case, the diaphragm openings of the lattice diaphragms are permanently aligned in a given parabolic path. The given lattice diaphragms can be precisely adjusted relative to the possible parabolic paths by the vertical translation elements. Thus, at any time only those neutrons will reach the measuring sample which in the entire neutron beam fly within the set parabolic path. However, when utilizing neutron beam pulses, it is essential to make use of substantially the entire intensity occurring in the pulse. This may be accomplished by the dynamic case of aligning he diaphragm openings. In the static case mentioned supra the diaphragm openings of all the n lattice diaphragms defining a partial beam are arranged, at least during an interval of time defined by the time in flight of monochromatic neutrons, in the parabolic path thereof. In this connection, the term “at least” connotes a permanent alignment with a respect to an individual parabolic path. In the dynamic case, a plurality of possible parabolic paths are traversed by the lattice diaphragms or their diaphragm openings. When setting each parabolic path a certain time lag may be taken into consideration along the neutron fly path in the measuring instrument. In the dynamic case, it is advantageous in connection with the neutron optical component in accordance with the invention to position the diaphragm openings, which during the time interval given by the flight time of monochromatic neutrons are positioned on the parabolic path of monochromatic neutrons, during further time intervals given by the flight time of other monochromatic neutrons, on their parabolic paths by locally shifting of the diaphragm openings. Monochromatic neutrons of different velocities can thus be collimated and focused. By the selective adjustment to different parabolic paths which constitutes influencing the gravitational force effectively acting on the flying neutrons, it is thus possible to adjust the passed wavelength bands of the neutron optical component in accordance with the invention functioning as a velocity selector. By continuously moving the lattice diaphragms over the parabolic paths of all monochromatic neutrons occurring in the neutron beam, the selection effects for the velocity of the neutrons disappear completely (the system if free of gravity) and the neutron optical component becomes a broad band optic of the kind required for pulsed neutron sources. Movement over all the parabolic paths in the pulsed neutron beam may advantageously take place in a continuous oscillating sequence. It is, therefore, of advantage oscillatingly to move the lattice diaphragms between the highest and the lowest occurring parabolic paths.

Execution of prescribed periods of movement for the entire neutron optical component in accordance with the invention with all lattice diaphragms as is required, for instance, in the gravity-free situation to be described, may be carried out by an electronically controlled movement of the lattice diaphragms. For this reason, it is advantageous to shift the lattice diaphragms by an appropriate chronological energization of drive units of the vertical translation units or of support rails on which they may be mounted. The drive units necessary for the shifting may be adjustment screws (micrometer screws) moved by controlled servo-motors, stepper motor driven adjustment screws, piezo-electrical actuators or any other electronically programmable movement system. In order to reduce occurring acceleration forces the entire component or the support elements of the lattice diaphragms may advantageously be mounted on springs so that its own frequency is close to the beat frequency. In that case, the electronic control must during the active phase also convert the sinusoidal movement of the oscillating base of the lattice diaphragms into a parabolic movement of constant acceleration.

The gravity effectively acting in the neutron optical component in accordance with the invention is changed by vertically moving the lattice diaphragms, during the passage of neutrons, at an acceleration A. Following a phase of uniform acceleration, the acceleration becomes effective in the opposite direction for returning the lattice diaphragms to their initial position. The rate of acceleration A defines the selection sharpness of the desired velocity band. It may thus be advantageous in the neutron optical component to carry out the shifting of the lattice diaphragms in chronologically defined phases of acceleration. In the exceptional case of A=g (g=acceleration of gravity) collimation takes place independently of acceleration. Hereafter, a numerical example for the execution of this principle will be set forth in greater detail. By selecting acceleration A=g, a gravitation free collimation will be attained for an interval of 40 ms. This constitutes a “relativistic collimator” in the sense of the principle of the general relativity of the movement. In other words, a free fall is simulated for the neutrons. During the remaining 20 ms of a 60 ms period as results for the case of a spallation source pulsed at 16.666 Hz, the lattice diaphragms may be returned to their initial position by selecting A=−2 g. Their initial position, at which the free fall commences, demands an vertically upward directed initial velocity of 0.1962 m/s. After 20 ms the lattice diaphragms reach their highest position 1.962 mm above their initial position, and during the remaining 20 ms of the free fall phase they fall back to their initial position. During the following 20 ms the velocity is reversed so that the cycle may commence again. During this interval they move through their lowest position which is 0.981 mm below their initial position.

For a better understanding of the neutron optical component, embodiments of the invention will hereafter be described in greater detail with reference to the schematic figures and diagrams, in which.

Figures 5, 6:
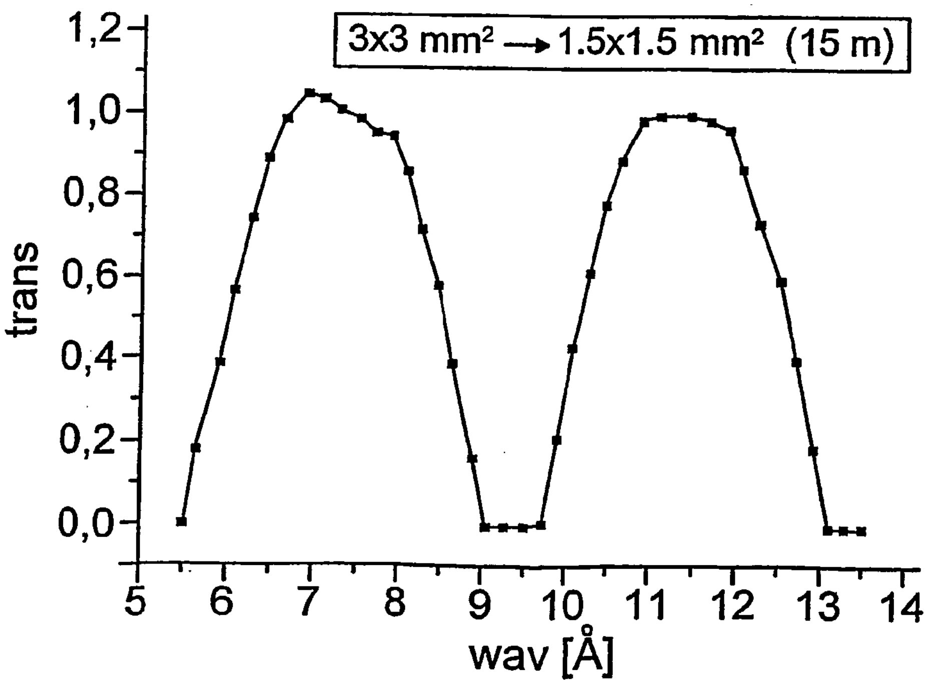

FIG. 5 id s dimension table; and

FIG. 6 is a velocity diagram of the neutron optical component functioning as a velocity selector.

Figure 1:
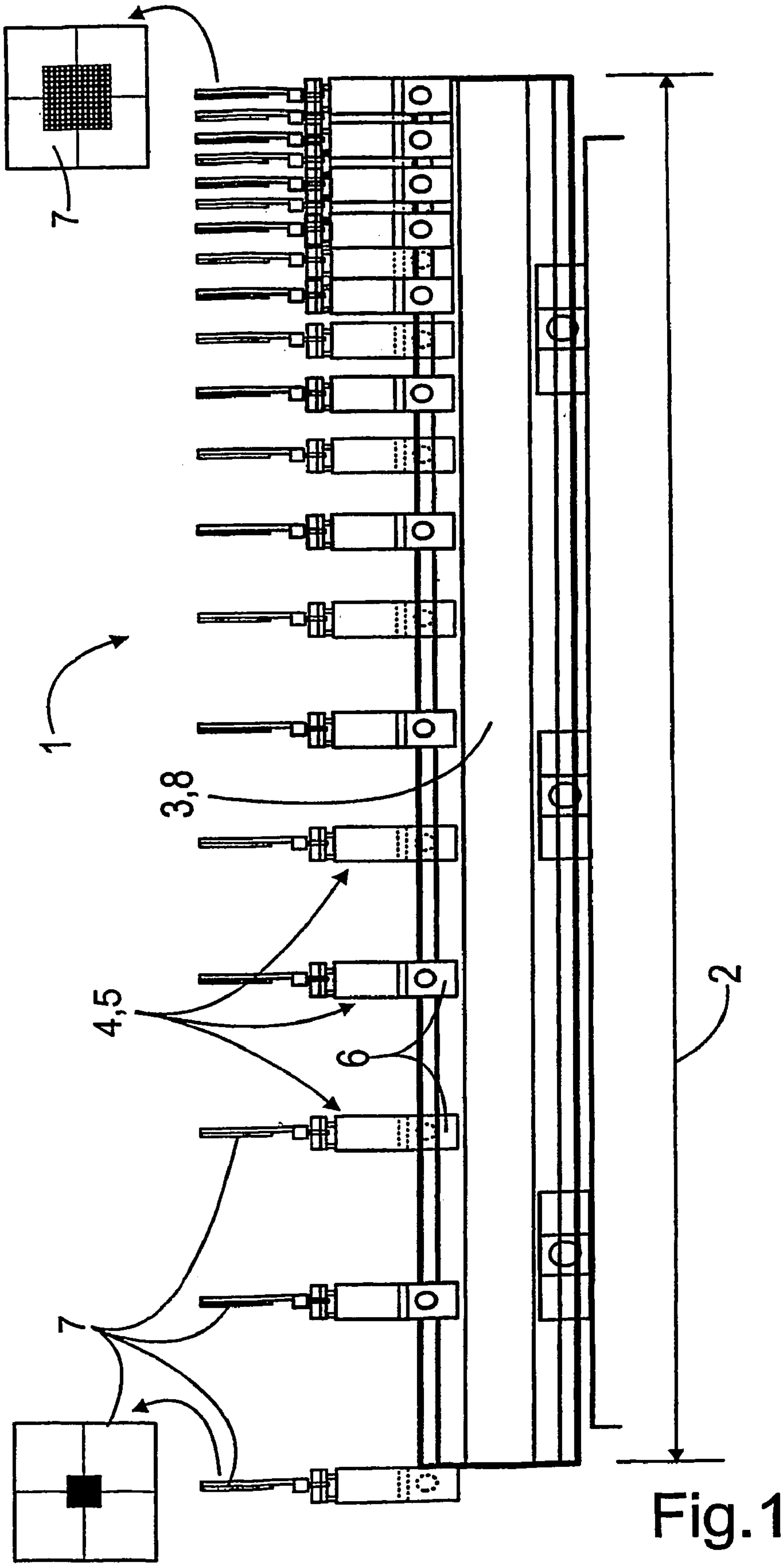
FIG. 1 is a side view of the neutron optical component.

FIG. 1 depicts the neutron optical component 1 in accordance with the invention for a neutron small angle scattering measuring technique in a side elevation. The longitudinal dimension 2 of the neutron optical component 1 from the provision of a neutron beam, taking place, in the embodiment shown, from the right side, to the measuring sample is mainly defined by a high-precision support rail 3. Its length may be, for instance, from 2 m to 20 m. In a guide groove of the support rail 3, there is arranged a number n of support elements 4. In the selected embodiment selected n=20. The support elements 4 are vertical translation units 5 of a particularly highly precise adjustability. In one embodiment they may be micrometer screws. In a static application case of a continuous neutron beam they are adjusted to a permanent value. In a dynamic case of a pulsed neutron beam they (or piezo actuators used in their place) are continuously adjusted by drive units 6, or other drive units not shown in FIG. 1 move the entire support rail 3 which would in that case be suitably flexible.

Each support element 4 is associated with a pinhole diaphragm structured as a lattice diaphragm 7. Accordingly, the total number of lattice diaphragms is n=20. For a better understanding, a lattice diaphragm 7 is depicted in frontal view at the beginning and at the end of the neutron optical component 1. In the shown state of the neutron optical element 1 all lattice diaphragms 7 are aligned on a straight beam axis. During operation, the alignment is carried on one or more parabolic paths for the velocity selection of monochromatic neutrons. Accordingly, the neutron optical component 1 in accordance with the invention operates not only as a focusing collimator, but also as a velocity selector. The distance between the lattice diaphragms 7 depends upon the longitudinal dimension 2 and upon a predetermined optical conductance of the neutron beam. Since at the beginning of the neutron optical component 1 the divergence of the neutron beam is still large, a small distance is here realized between individual lattice diaphragms 7. With an increasingly reduced beam divergence and, therefore, absorption requirement by a sequence of several consecutive lattice diaphragms 7, the distance between the lattice diaphragms 7 may be correspondingly increased. In the embodiment shown, the distance distribution selected between the lattice diaphragms 7 is non-linear. It makes possible an optimum reduction of the beam divergence. Because of the narrow distance of the support elements 4 in the initial section it is useful, for the dynamic case of achieving a broad band state, alternatingly to align the drive units 6 associated with the support elements 4, and connected therewith at a right angle, at opposite sides of the support elements 4 which may be alternatingly arranged on two parallel support rails 3, 8.

Figure 2:
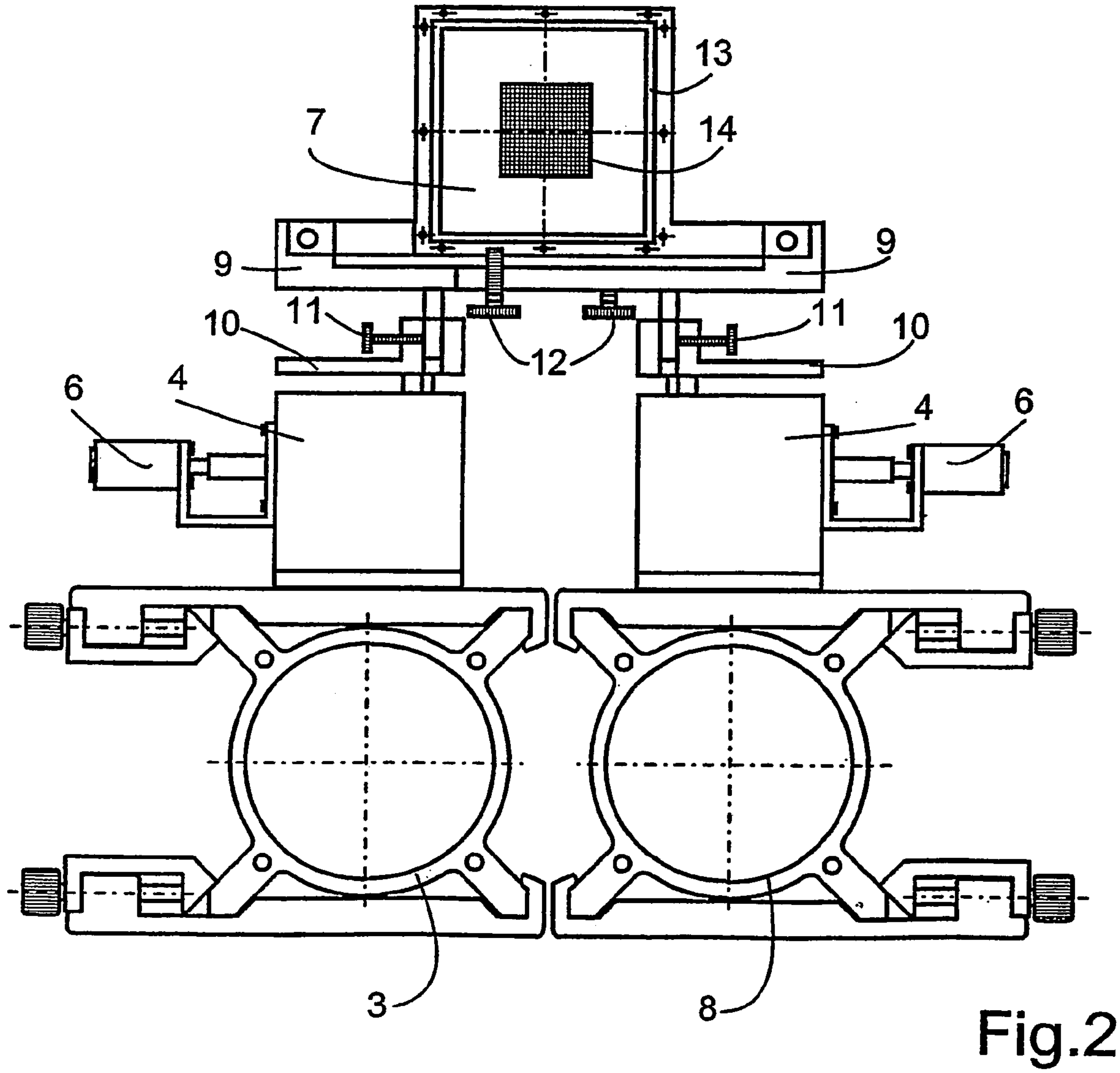
FIG. 2 is a front view of the structure according to FIG. 1.

These details may be seen in FIG. 2 which depicts the neutron optical component 1 in accordance with the invention from the front from the direction of an impinging neutron beam, i.e. from the right side of FIG. 1. The parallel support rails 3, 8 are shown in the lower section. The first support element 4 is arranged on the support rail 3 in an orientation to the left, and in its upper section it supports the first lattice diaphragm 7 by means of a support frame 9. The support element 4 arranged with a right orientation on the rail 8 supports the second lattice diaphragm in a position precisely behind the first lattice diaphragm 7 so that it cannot be seen in FIG. 2. Both support elements 4 shown are in their lower section provided with a support slide 10 for positioning along the support rails 3, 8 and for securing by knurled screws 11. In their middle section the support elements 4 are connected to electrically energizable drive units 6 for vertically adjusting the lattice diaphragms 7. In its lower section the support frame 9 is provided with a knurled screw 12 for precisely adjusting the lattice diaphragm 7. In the embodiment shown, the lattice diaphragm is structured as a lattice frame 13 provided with square diaphragm openings 14.

Figure 3:
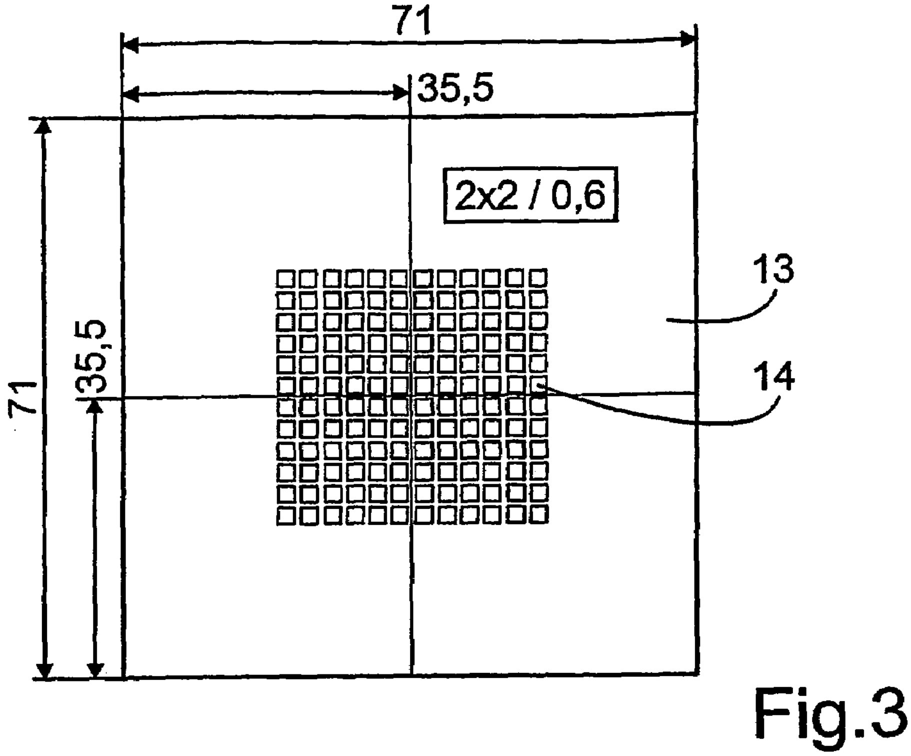
FIG. 3 is a lattice diaphragm at the beginning of the structure.
Figure 4:
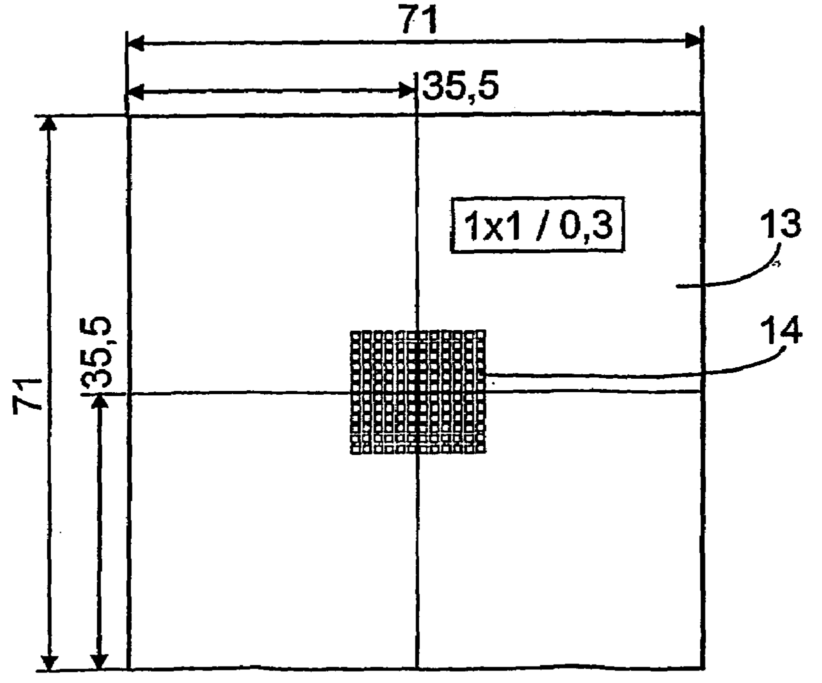
FIG. 4 is a lattice diaphragm at the end of the structure.

FIG. 3 depicts in greater detail the lattice frame 13 of FIG. 2 at the input side (right side) of the neutron optical component 1. It is made of neutron-absorbing cadmium by high-precision manufacturing techniques (tolerance±0.02 mm) and is provided with 12 rows and 12 columns and, therefore, m=144 diaphragm openings. The neutron beam penetrating through the lattice frame 13 is subdivided into m=144 partial beams in accordance with the number m of aperture openings. Each partial beam represents its own channel, and over the sequence of all the lattice frames 13 or lattice diaphragms 7 each partial beam is increasingly converged and focused on a detector site. At a relatively large transmission surface on the measuring sample, a high resolution is possible, nevertheless, owing to the maintained high neutron intensity and a particularly highly accurate measurement of small angle scattering at the measuring sample is possible because of the focusing on the detector site. In this example, the diaphragm openings 14 in the lattice frame 13 of FIG. 3 are the largest ones (2 mm×2 mm). The horizontal and vertical width of the web is 0.6 mm in the case at hand. The smallest diaphragm openings 14 (1 mm×1 mm) are provided in the lattice frame 13 at the output side (left side) of the neutron optical component of FIG. 4. Here, the width of the web is 0.3 mm. The size reduction of the individual diaphragm openings 14 and web widths can be clearly discerned. This reduction which corresponds to a narrowing of the individual channels and, hence, to an improvement of their divergence, is a function of the position of the lattice frames 13 (or lattice diaphragms 7) within the cone of convergence of the neutron optical component 1 in accordance with the invention for attaining a large convergence of the partial beams generated by the diaphragm openings 14. The absolute number of diaphragm openings 14 is dependent upon the desired irradiation surface on the measuring sample which is to be as large as possible and upon the attainable reduction of the divergence.

Dimensions of the diaphragm openings and webs of one embodiment may be gleaned from the table of FIG. 5. The first column sets forth the lattice diaphragm number I. The absolute position pos of the lattice diaphragms from the input side (right) of the neutron optical component in accordance with the invention is set forth in mm in the second column. The occurring divergence div is shown in the third column as a relative factor. Its reduction as the positions of the lattice diaphragm progress can be clearly seen. The opening diameter open of the square diaphragm openings is set forth in mm in the fourth column. It decreases continuously from 2 mm to 1 mm. The fifth column shows the reduction factor redf associated with the diminution. Such dimensions can be executed for any desired constellation of parameters without any problems by means of computer-assisted calculation programs.

As has been stated supra the neutron optical component in accordance with the invention does not only operate as a focusing collimator, but also as a velocity selector. It relies upon the gravity affecting the course of the parabolic paths of the neutrons. The transformation of the velocity selection for a neutron optical component with an exemplarily selected transmission of square diaphragm openings from 3 mm to 1.5 mm over a longitudinal extent of 15 m is shown in the velocity diagram of FIG. 5 with the transmission trans being superimposed on the wavelength wav. The left and the right semi curve pertain to different wavelength bands, i.e., to different positions of the lattice diaphragms on two parabolic paths. Thus, a specific wavelength band may be selected by the setting of the parabolic path (true for the static case of a continuous neutron beam; in the dynamic case with a pulsed neutron beam all wavelengths occurring in the neutron beam are continually and cyclically traversed by an accelerated movement). The interpretative parameters of the neutron optical component may thus be differently set without any problems.

LIST OF REFERENCE CHARACTERS

1 neutron optical component
2 longitudinal dimension
3 support rail
4 support element
5 translation unit
6 drive unit
7 lattice diaphragm
8 support rail
9 support frame
10 support slide
11 knurled screw
12 knurled screw
13 lattice frame
14 diaphragm opening
n number of lattice diaphragms
m number of diaphragm openings
l number of lattice diaphragm
pos position (m)
div divergence
open diameter of opening
redf factor of reduction
trans transmission
wav wavelength

The invention claimed is:

1. A neutron optical component for the technique of measuring neutron small angle scattering with a plurality of pinhole diaphragms of a neutron-absorbing material, each with at least one active diaphragm opening for reducing the beam divergence, mounted in support elements over the extent of the neutron beam between the neutron source and measuring sample, the small-angle beam scattering of which is being detected by a detector, characterized by the provision of pinhole apertures of a number n ensuring the conductance of the beam and depending upon the requisite measurement resolution and the longitudinal dimension (2) of the neutron beam, the pinhole diaphragms being structured as lattice diaphragms (7) of variable spacing between each other, each lattice diaphragm (7) being provided with a constant number m of closely adjacent diaphragm openings (14) which subdivide the penetrating neutron beam into a number m of partial beams and which are of diminishing size in the direction of the measuring sample for reducing the divergence of the partial beams, with each of the diaphragm openings (14) of all n lattice openings (7) defining a partial beam being arranged during a time interval defined by the flight time of monochromatic neutrons on the parabolic path thereof and all partial beams being focused on the detector.

2. The neutron optical component of claim 1, characterized by the fact that the diaphragm openings (14) are dimensioned in the range of from 1 mm to 2 mm.

3. The neutron optical component of claim 2, characterized by the fact that the diaphragm openings (14) are manufactured by computer-controlled manufacturing techniques with a high fabrication precision.

4. The neutron optical component of claim 1, characterized by the fact that that the distance of the lattice diaphragms (7) between each other increases in the direction of the measuring sample.

5. The neutron optical component of claim 4, characterized by the fact that the lattice diaphragms (7) are structured as lattice frames (13) with square diaphragm openings (14).

6. The neutron optical component of claim 5, characterized by the fact that the lattice frames (13) are made of cadmium.

7. The neutron optical component of claim 1, characterized by the fact that the support elements (4) of the lattice diaphragms (7) are structured as vertical translation units (5) of high precision adjustability.

8. The neutron optical component of claim 7, characterized by the fact that the vertical transmission units (5) are structured as setting members with micrometer screws or as piezo actuators.

9. The neutron optical component of claim 1, characterized by the fact that the diaphragm openings (14) positioned during a time interval defined by the flight time of monochromatic neutrons on the parabolic path pf monochromatic neutrons are positioned during further time intervals defined by the flight time of other monochromatic neutrons on the parabolic paths thereof by a corresponding local shift of the lattice diaphragms (7).

10. The neutron optical component of claim 9, characterized by the fact that the lattice diaphragms (7) are continually moved over the parabolic paths of all monochromatic neutrons occurring in the neutron beam.

11. The neutron optical component of claim 10, characterized by the fact that that the lattice diaphragms (7) are oscillatingly moved between the highest and the lowest occurring parabolic path.

12. The neutron optical component of claim 11, characterized by the fact that the moving of the lattice diaphragms (7) is carried out by a corresponding chronological energization of drive units (6) of the vertical translation units (5) or of support rails (3, 8) carrying them.

13. The neutron optical component of claim 10, characterized by the fact that the drive units (6) are structured as controlled servomotors, moved adjustment screws, stepper motor driven adjustment screws or as piezoelectric actuators.

14. The neutron optical component of claim 12, characterized by the fact that that the moving of the lattice diaphragms (7) is carried out during chronologically defined phases of acceleration.

15. The neutron optical component of claim 1, characterized by the provision of a resilient support for the support elements (4) of the lattice diaphragms (7).

* * * * *